(12) United States Patent
Schulte et al.

(10) Patent No.: US 6,352,285 B1
(45) Date of Patent: Mar. 5, 2002

(54) ROLL BAR PROTECTION SYSTEM FOR MOTOR VEHICLES

(75) Inventors: Michael Schulte, Olpe; Reinhard Nowack, Drolshagen; Michael Nass; Rainer Jesse, both of Bergneustadt, all of (DE)

(73) Assignee: ISE Innomotive Systems Europe GmbH, Bergneustadt (DE)

( * ) Notice: Subject to any disclaimer, the term of this patent is extended or adjusted under 35 U.S.C. 154(b) by 0 days.

(21) Appl. No.: 09/505,563

(22) Filed: Feb. 17, 2000

(30) Foreign Application Priority Data

Feb. 19, 1999 (DE) .......................... 199 06 912

(51) Int. Cl.[7] .............................................. B60R 21/13
(52) U.S. Cl. ..................... 280/756; 280/751; 280/753; 297/216.12; 297/216.13
(58) Field of Search ................... 280/756, 753, 280/751; 297/403, 410, 216.12, 216.13

(56) References Cited

U.S. PATENT DOCUMENTS

| | | | | |
|---|---|---|---|---|
| 3,186,763 A | * | 6/1965 | Ferrara | 297/410 |
| 3,397,911 A | * | 8/1968 | Brosius, Sr. | 297/216 |
| 4,015,875 A | * | 4/1977 | Setina | 296/24 R |
| 4,822,102 A | * | 4/1989 | Duvenkamp | 297/403 |
| 4,840,398 A | * | 6/1989 | Matthias et al. | 280/756 |
| 5,056,816 A | * | 10/1991 | Lutze et al. | 280/751 |
| 5,110,185 A | * | 5/1992 | Schmutz et al. | 297/410 |
| 5,205,585 A | * | 4/1993 | Reuber et al. | 280/753 |
| 5,484,189 A | * | 1/1996 | Patterson | 297/410 |
| 5,626,361 A | * | 5/1997 | Heiner | 280/756 |
| 5,788,402 A | * | 8/1998 | Banda et al. | 403/374 |
| 6,199,947 B1 | * | 5/2001 | Wiklund | 297/216.12 |

FOREIGN PATENT DOCUMENTS

| | | |
|---|---|---|
| DE | 38 22 461 | 1/1990 |
| DE | 39 27 265 | 2/1991 |
| DE | 39 30 171 | 3/1991 |
| DE | 43 42 401 | 6/1995 |

* cited by examiner

Primary Examiner—Brian L. Johnson
Assistant Examiner—Dianna Draper
(74) Attorney, Agent, or Firm—Hudak & Shunk Co., L.P.A.

(57) ABSTRACT

A roll bar protection system for motor vehicles comprising an outer box profile forming a case for the components of the roll bar protection system, being mounted firmly on the vehicle, an inner box profile, able to move in the outer box profile via guide elements which is designed as a roll bar and accommodates a fast drive for its extension into the upper end protection position in event of danger, and a drive arrangement for a continuous movement of the inner box profile, consisting of an electric motor/gearing arrangement with a threaded spindle of predetermined length, as well as a tie-bar which can be moved in the outer box profile, having a nut for engagement with the threaded spindle, and which is detachably connected to the inner box profile.

20 Claims, 10 Drawing Sheets

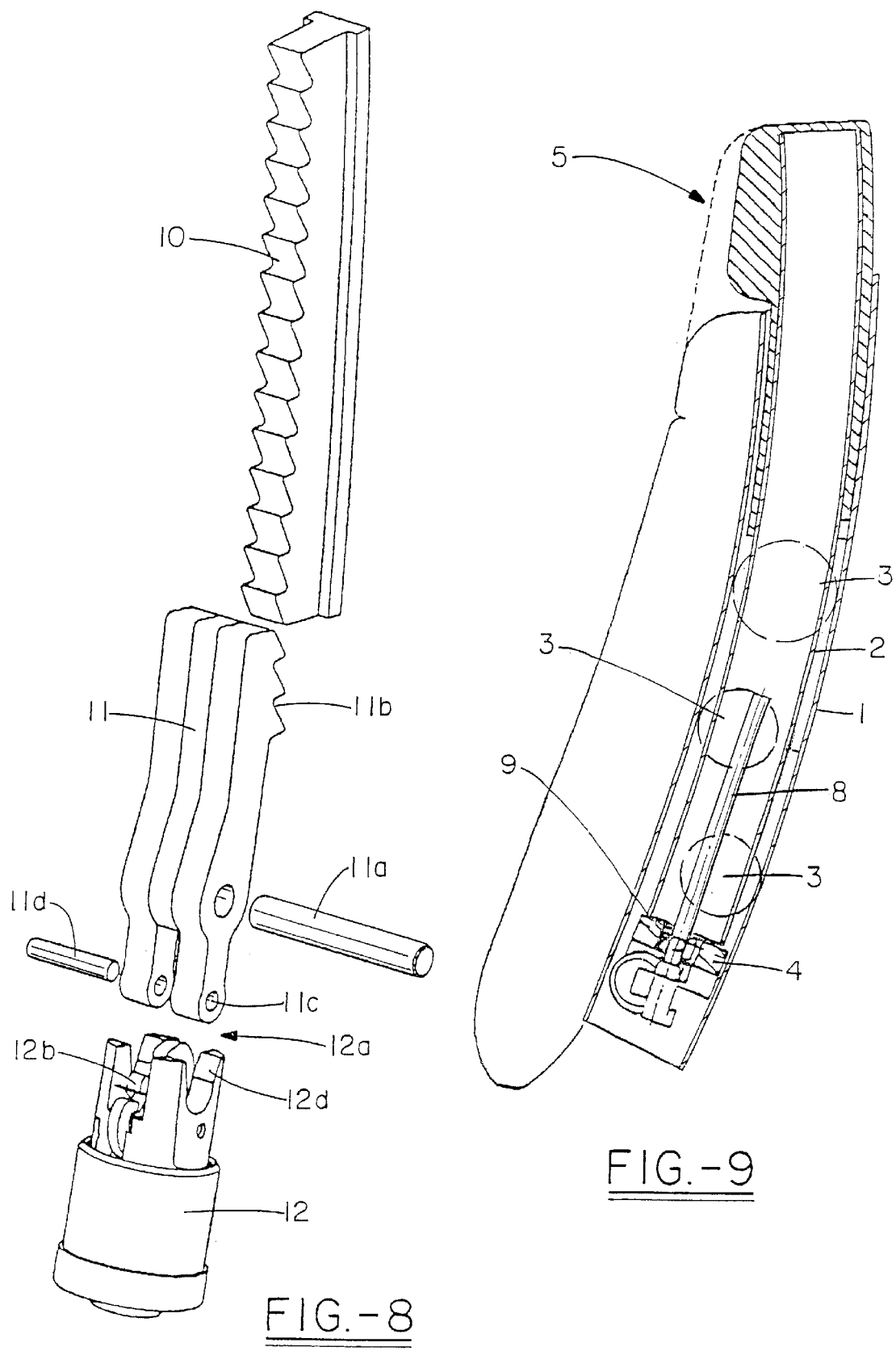

ROLL BAR PROTECTION SYSTEM FOR MOTOR VEHICLES

BACKGROUND OF THE INVENTION

Figure 1:
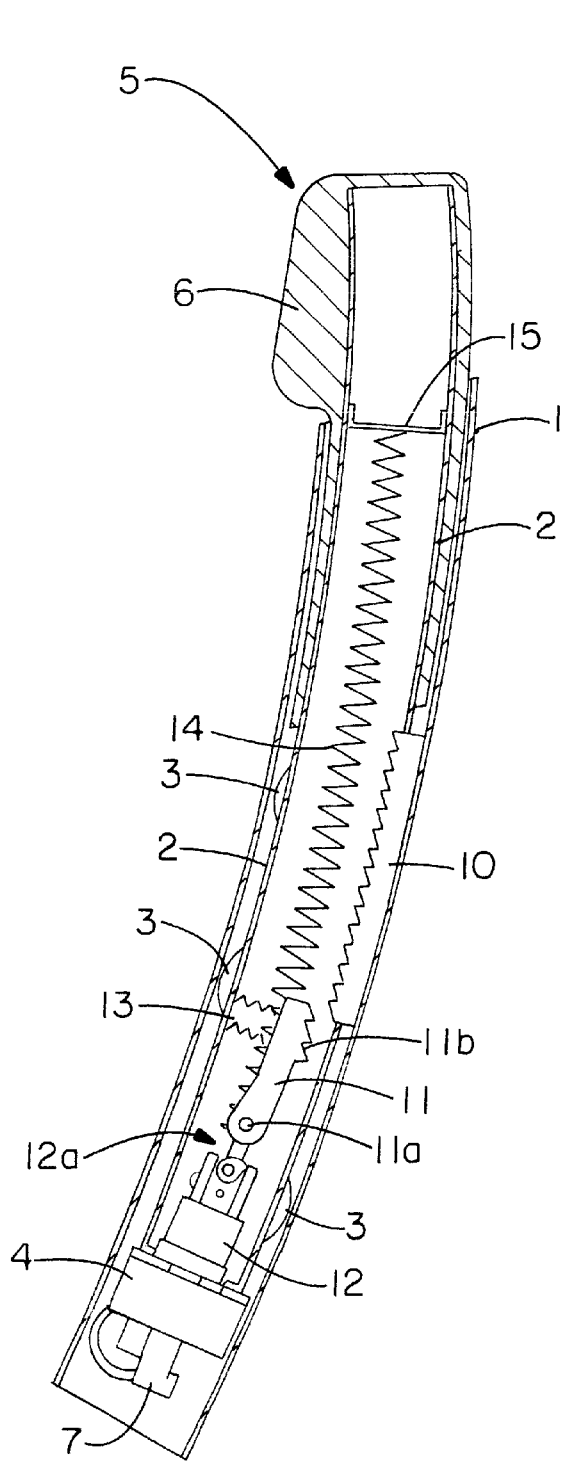

It is known from DE 39 30 171 C2 how to integrate the roll bar with the headrest so that the headrest is provided with a groove-like recess on top and at the side, which receives the roll bar when it is in its rest position. The roll bar then cannot be seen and does not detract from the safety.

In this familiar case, however, the headrest cannot be adjusted in height, which is a disadvantage. Integration of the roll bar in the headrest has the sole purpose of concealing the bar.

From DE 38 22 461 A1 a roll bar protection system has become familiar, which is integrated with the headrest such that the upper end of the U-shaped roll bar is configured directly as a headrest and secures a headrest cushion. This headrest cushion can be adjusted in height along the legs of the roll bar and relative to them. Due to its design, however, the headrest cushion can only be adjusted manually in height.

From DE 39 27 265 A1 there is known a power-operated headrest with integrated roll bar protection function, which can be moved continuously into different positions, driven by an electric motor, and from each position the roll bar protection system can be placed in the maximum end position in a danger situation. The known system has a housing of shaped sheet metal parts which can be screwed together with the vehicle's superstructure and which is arranged behind the rear seats of the convertible. In the housing, a U-shaped roll bar in the form of an appropriately curved steel tube is movably mounted by means of guide rollers. The roll bar is provided with a head-support cushion, forming the headrest, i.e., it is likewise fully integrated with the headrest.

The roll bar engages with two driving compression springs, which are held in a pretensioned condition. An electric motor drive unit is arranged between the compression springs, firmly fixed to the vehicle, with gearing, toothed belt, and a pinion which engages teeth on the roll bar. The toothed belt is coupled to the gearing by a toothed wheel, which is driven by a coupling with radially movable ball elements by the shaft of a toothed belt drive which engages with the gearing. This shaft is connected to a trigger magnet, which in a danger situation separates the shaft from the toothed wheel in the coupling, so that the toothed belt is uncoupled from the gearing. This releases the roll bar, which is taken to its end position by means of the compression springs. This familiar roll bar protection system has the following disadvantages:

- The basic elements of the roll bar system (case and bar) can only be produced with relative difficulty.
- The drive arrangement for the continuous movement of the roll bar, the so-called comfort drive, which at the same time serves to adjust the height of the headrest, is relatively complicated and also relatively prone to repairs in respect of the toothed belt drive.
- The release system between roll bar and release magnet to free the roll bar in event of a flip-over is complicated and can only be restored with difficulty to the initial condition after being released.
- Continuous moving of the roll bar with the headrest influences the tension of the driving compression springs. In particular, when the bar is moved down, the electric motor must work against the pretension of the springs and must therefore be dimensioned sufficiently robust.

SUMMARY OF THE INVENTION

The purpose of the invention is to configure the roll bar protection system mentioned at the outset so that it can be made cost effectively, and have a simple drive arrangement for the continuous movement of the roll body and the headrest, not having any influence on the fast drive for a roll-over situation.

This purpose is accomplished according to the invention by a rollover protection system for motor vehicles that is coordinated with a seat of the vehicle, with:

- an external box profile which can be firmly attached to the vehicle, forming a case for the components of the rollover protection system,
- an inner box profile, supported so that it can move in the outer box profile by guide elements, being designed as the roll body, and accommodating a fast drive for extending into the upper end protection position, and
- a drive arrangement for a continuous movement of the inner box profile, consisting of an electric motor/gearing arrangement with a threaded spindle of predetermined length, as well as a tie-bar which can move in the outer box profile, possessing a nut for active engagement with the threaded spindle, and being detachably connected to the inner box profile.

An especially simple and compact configuration of the roll bar protection system according to the invention can be achieved by integrating the headrest into the roll body, having a head support cushion forming the headrest molded on the upper piece of the inner box profile.

In theory, however, the headrest can be separate from the roll body, in that, besides the inner box profile, and in parallel with it, there is at least one additional lengthwise molded body secured to the tie-bar, guided in the outer box profile, on which a head support cushion constituting the headrest is formed, in front of the inner box profile facing the passenger.

In order to properly guide the inner box profile in the outer box profile, according to one configuration of the invention the system is configured so that guide rollers are arranged as guide elements on the inner box profile and guide grooves are formed in the outer box profile to accommodate the guide rollers and the tie-bar.

The fast drive of the system can essentially be formed by the familiar components. An especially simple and effective system can be achieved according to a further modification of the invention if the fast drive is formed by a pretensioned driving compression spring, which is arranged in the inner box profile, and which is supported by one end (the upper one) against an upper crosspiece of the inner box profile, while its other, lower end, is firmly joined to the tie-bar and if the inner box profile is connected to an actuator by a release system which releases this box profile in event of danger, being firmly mounted on the tie-bar.

Thanks to this design, therefore, the fast drive in a state of danger can reliably move the inner box profile to the upper protected position with simple means, in any given position of the tie-bar.

There are several conceivable design solutions for connecting the inner box profile via the release system to the actuator on the tie-bar and for locking this box profile after the release to prevent an unintentional resetting. An especially simple construction can be achieved by a further modification of the invention, if a locking latch with a toothed profile is linked by a shaft on the inner box profile, which is detachably connected via the release system to the actuator when it is activated in the danger situation, and if a toothed rod is firmly arranged inside the outer box profile, which can interact with the toothed profile of the locking latch in event of danger after the releasing of the locking latch by the release system, thanks to compression springs engaging with the locking latch.

This design requires only a few structural pieces, which can be made without major expense and which also enable relatively easy installation.

There are various possibilities available for the configuration and linking of the locking latch. A first embodiment results, according to a further modification of the invention, if the locking latch is fashioned as a two-arm lever, with an upper arm that is longer and a lower arm that is shorter relative to the linkage, there being arranged the toothed profile on the longer upper lever arm, with which the compression springs engage, and on the shorter lower lever arm a detent bolt for a detachable engagement with a hook-shaped locking element of the actuator, forming the release system.

A second, more favorable possibility for the distribution of forces results, according to a further modification of the invention, when the locking latch is fashioned as a single-arm lever, being linked at its upper end to the inner box profile by the shaft, which is provided with the toothed profile in an intermediate segment with which the compression springs engage, and at its lower end there is arranged a [noun omitted] for a detachable engagement with a hook-shaped locking element of the actuator, forming the release system.

The construction of the above-described locking system, therefore, possesses the following essential characteristics:

Locking latch and detent bolt form a single unit

The system of tie-bar—actuator—locking latch—detent bolt—compression springs—inner box profile forms a single unit for the comfort mode.

This system is separated into two individual components by the release of the actuator.

A remote-control reversal of the fast drive system is possible through the electric drive of the tie-bar.

There are a number of possibilities for the arrangement of the roll bar protection system in the vehicle.

According to a preferred embodiment, it is possible to integrate the system in the seat of the vehicle in simple fashion by having both the inner and outer box profile curved in a circular arc, and the outer box profile being fastened behind the seat, preferably to the rear wall of the vehicle.

But it is also possible to configure the box profiles in linear fashion, and to mount the outer box profile forming the case directly behind the seats of the vehicle.

Other characteristic features of the invention will emerge by the description of a sample embodiment represented in the drawings.

BRIEF DESCRIPTION OF THE INVENTION

Figure 2:
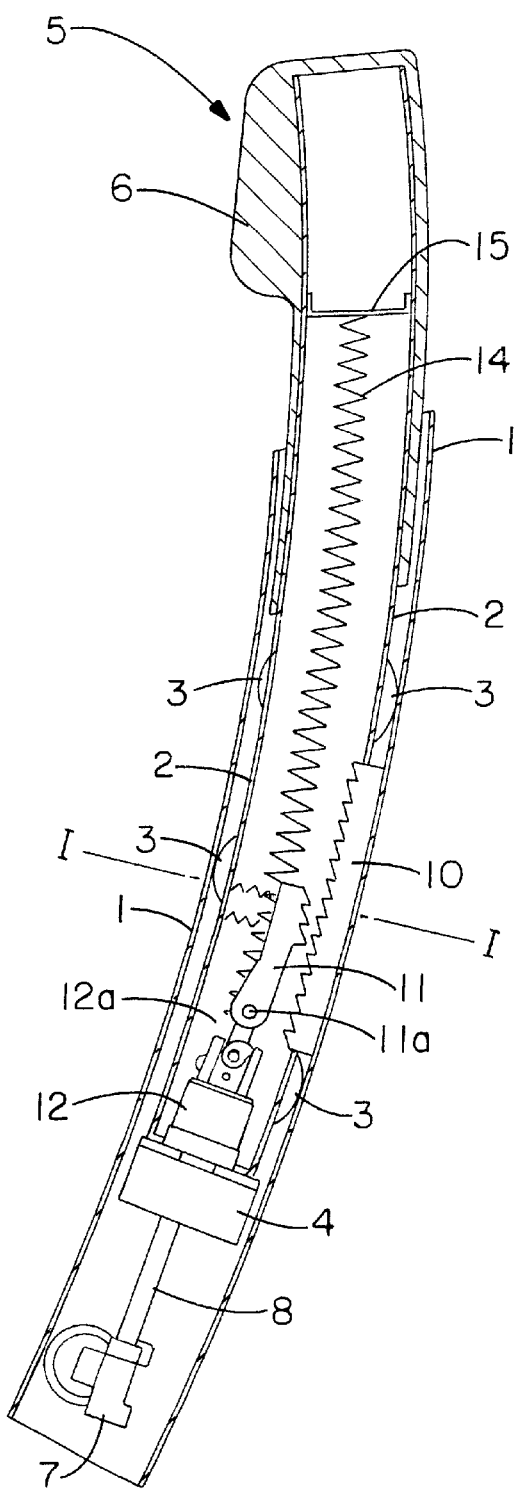
Figure 3:
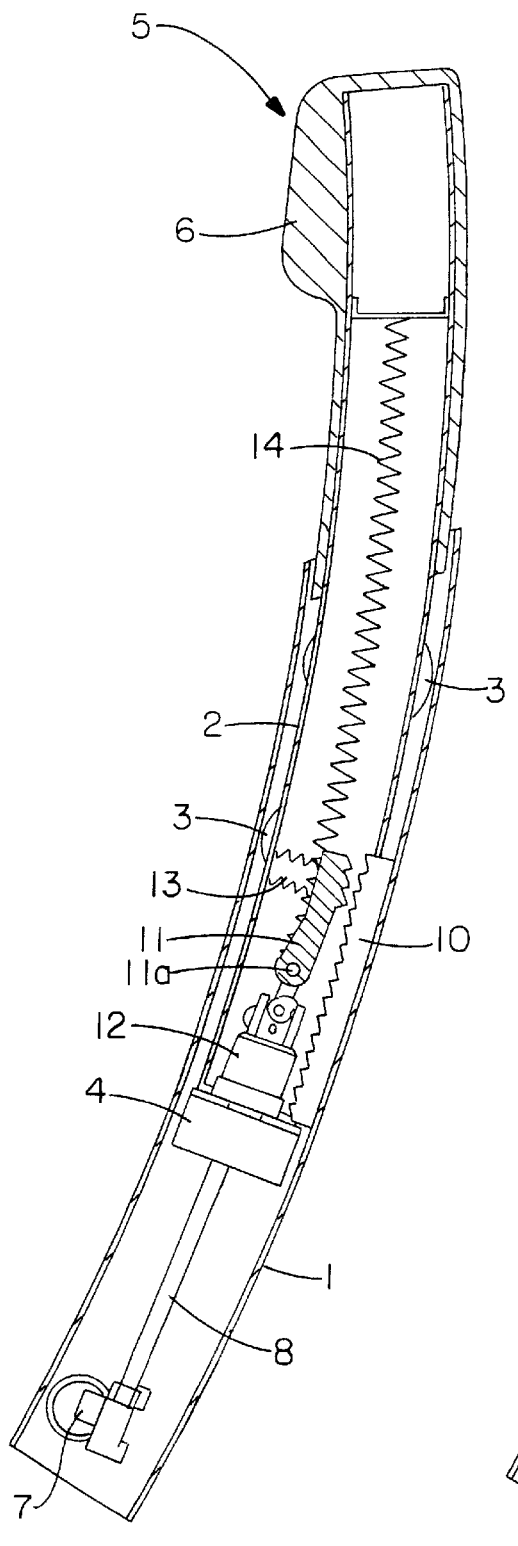
Figure 4:
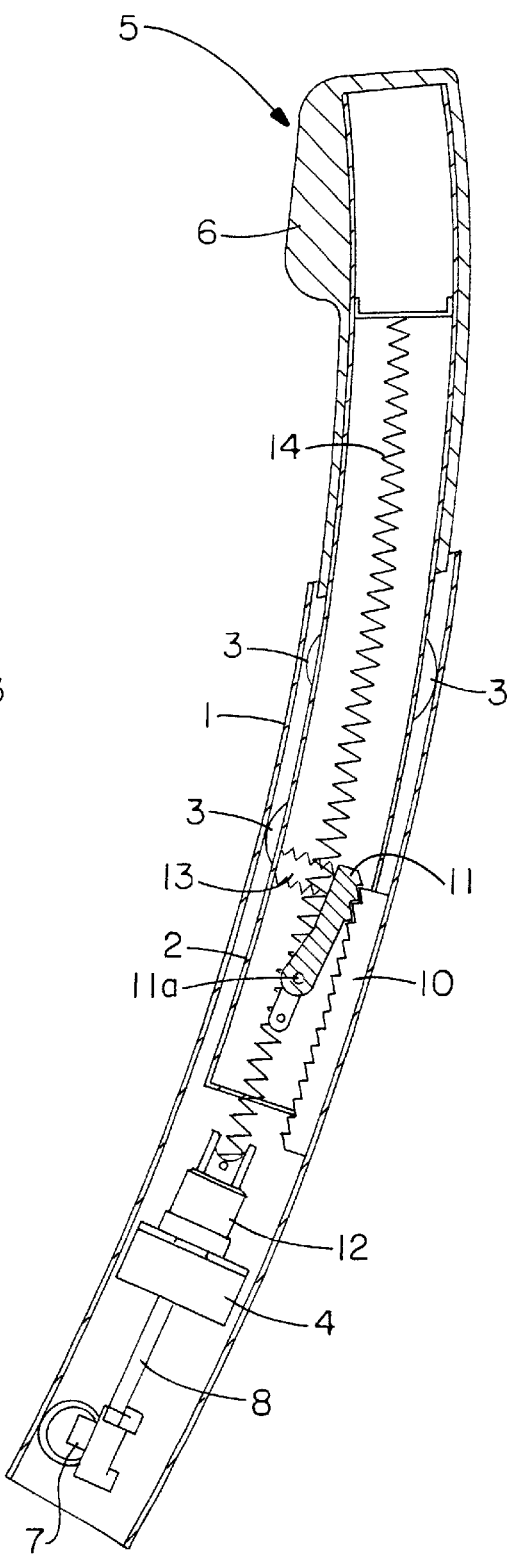
Figure 5:
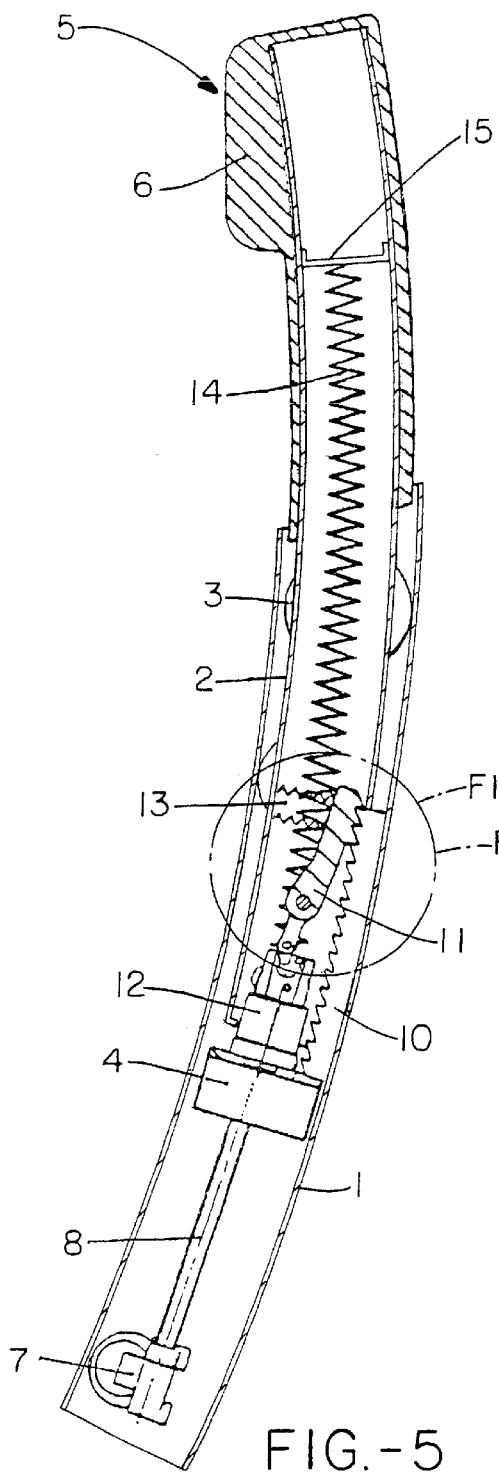
Figure 6:
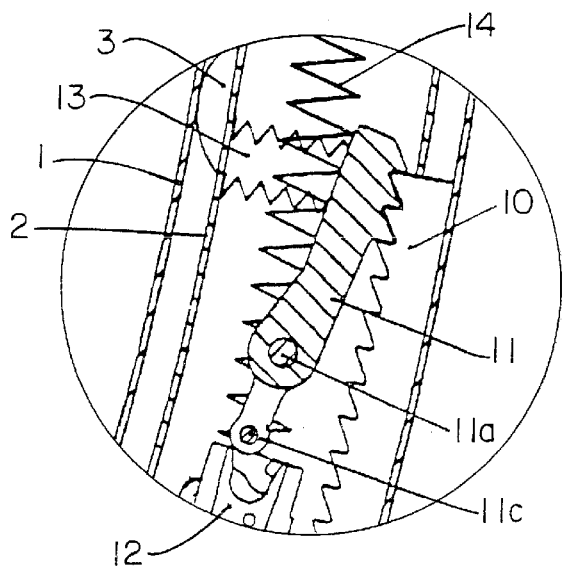
Figure 7:
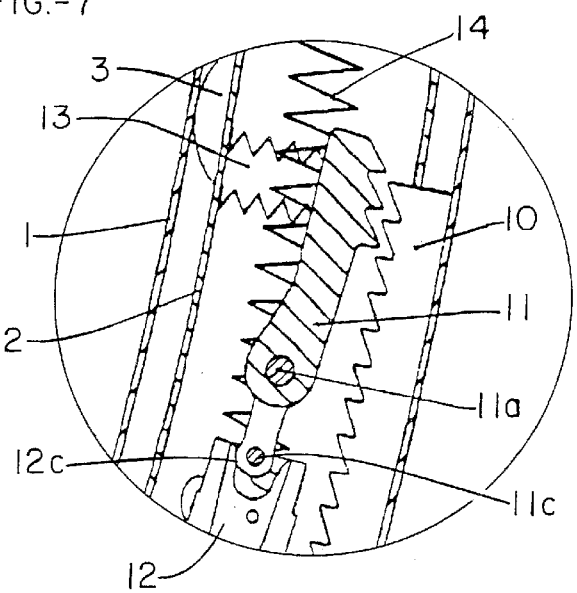
Figure 10:
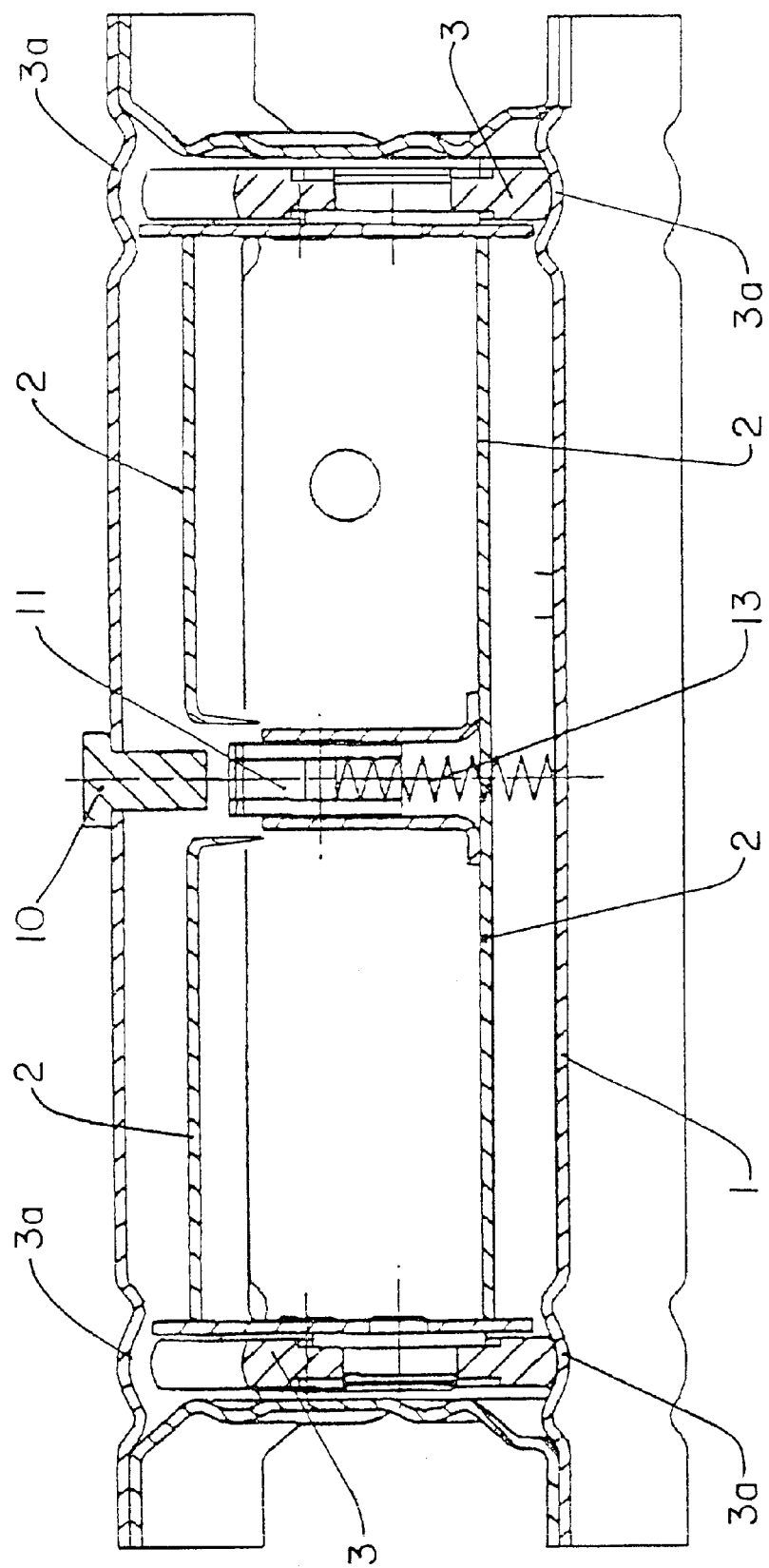
Figures 11, 12:
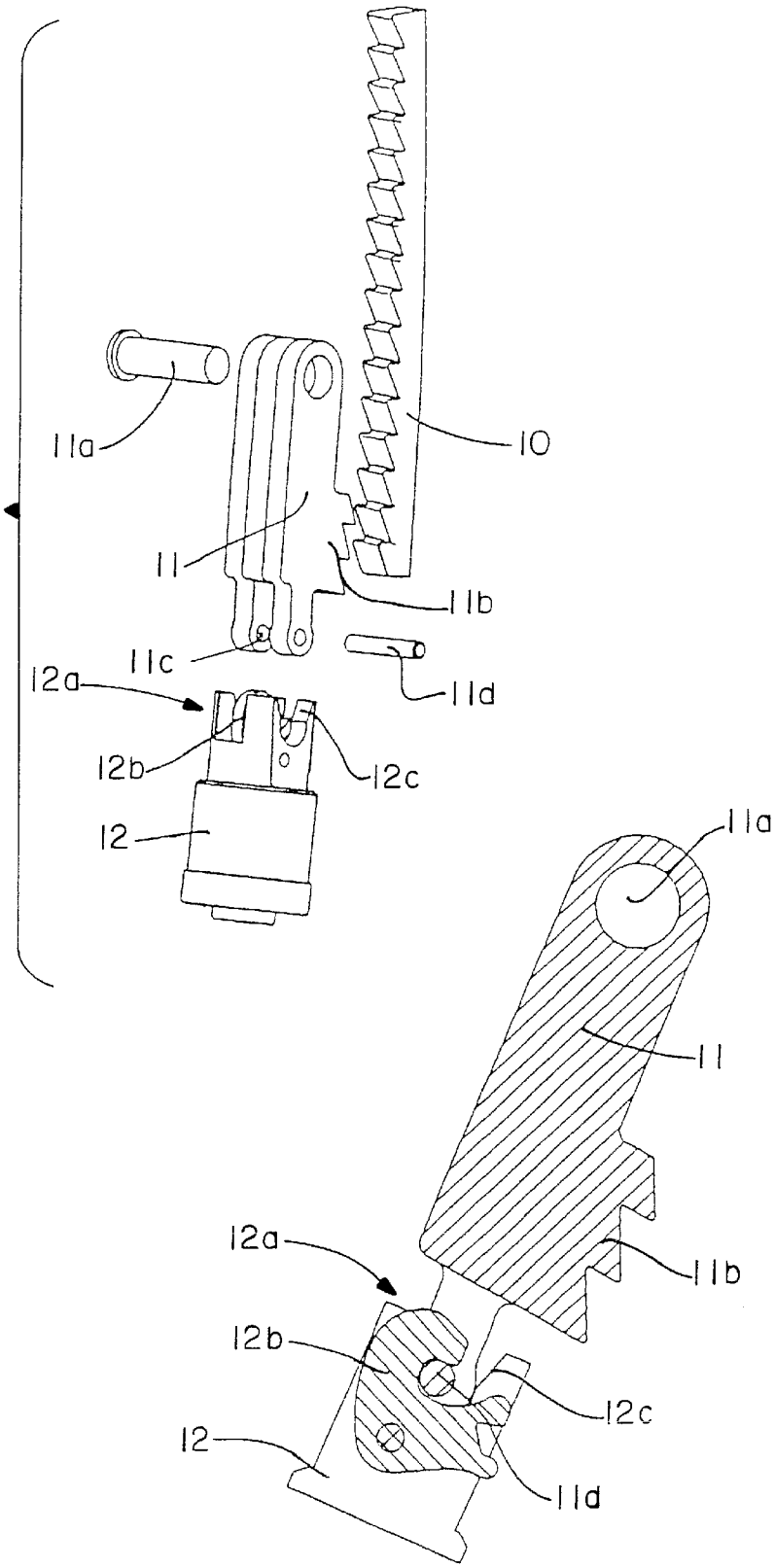
Figure 13:
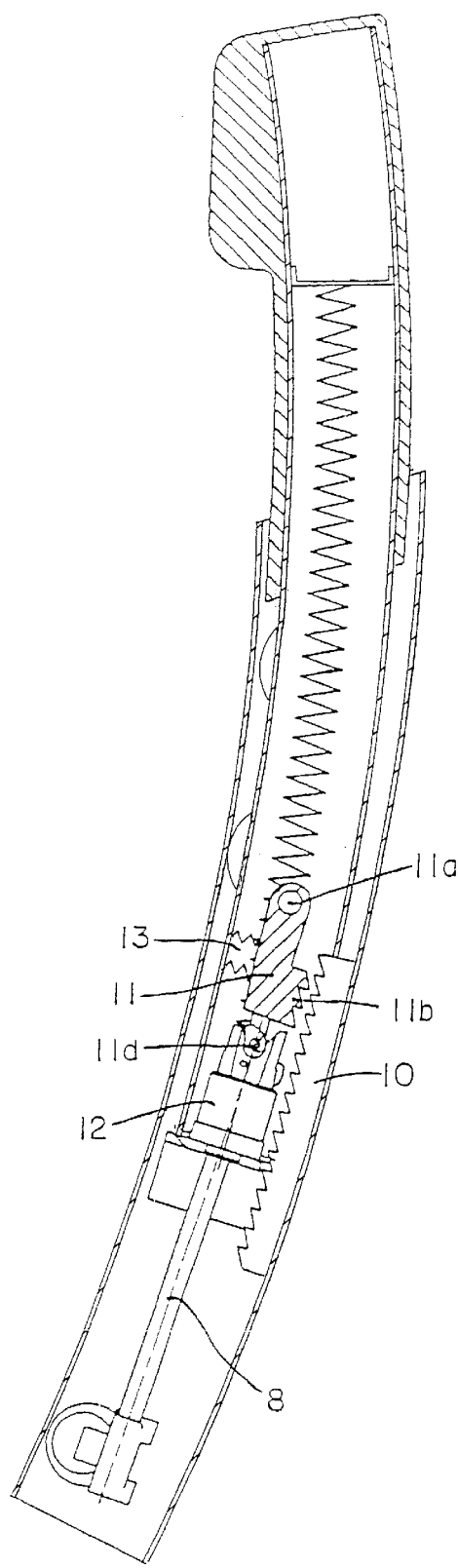
Figure 14:
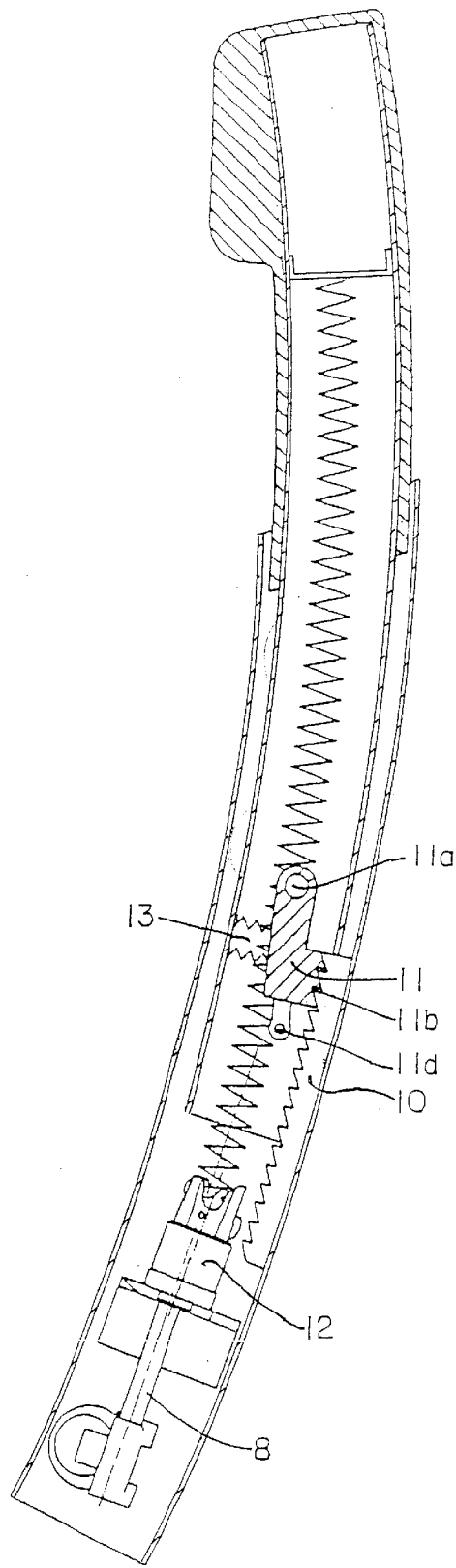
Figures 15, 16, 17:
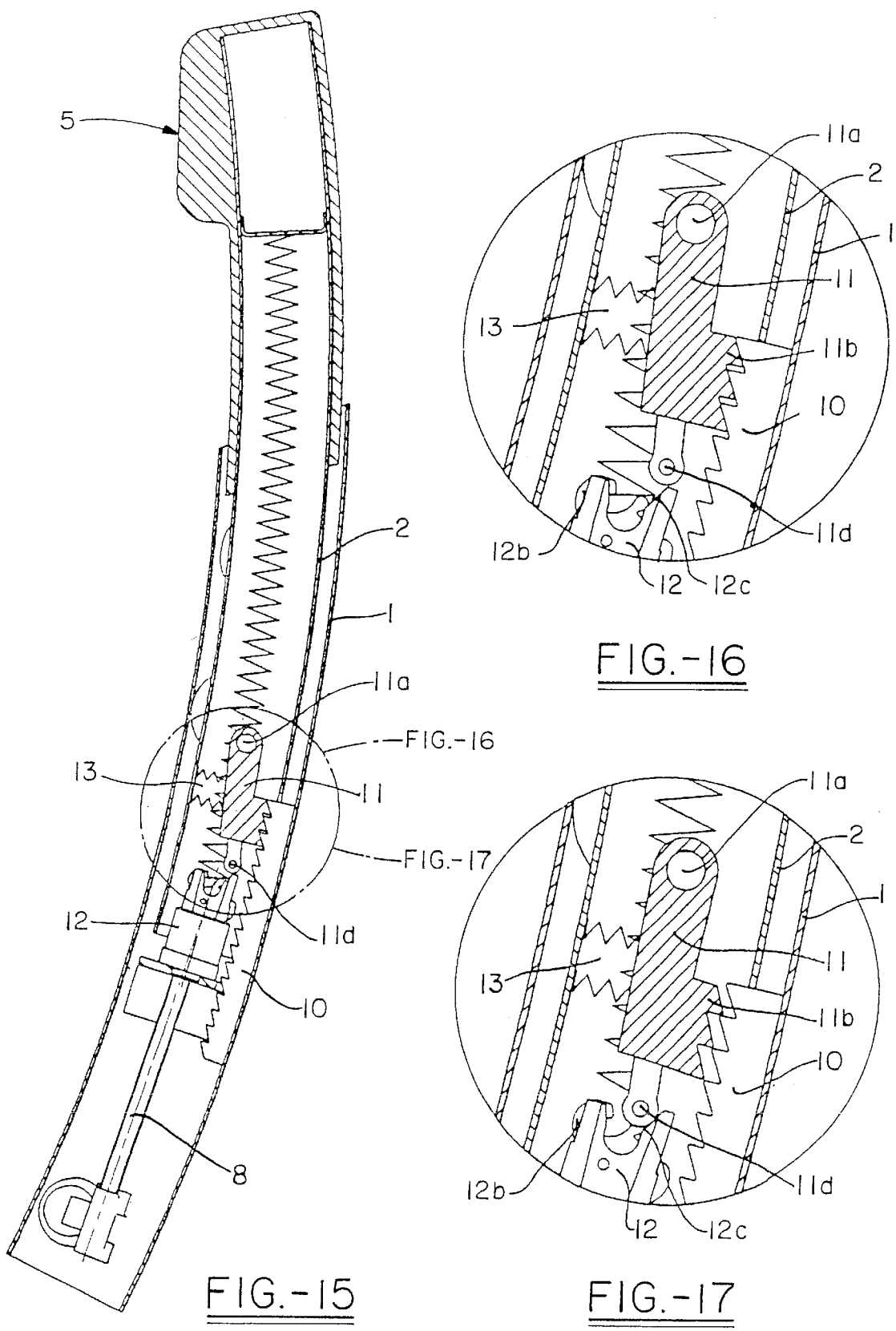
Figure 18:
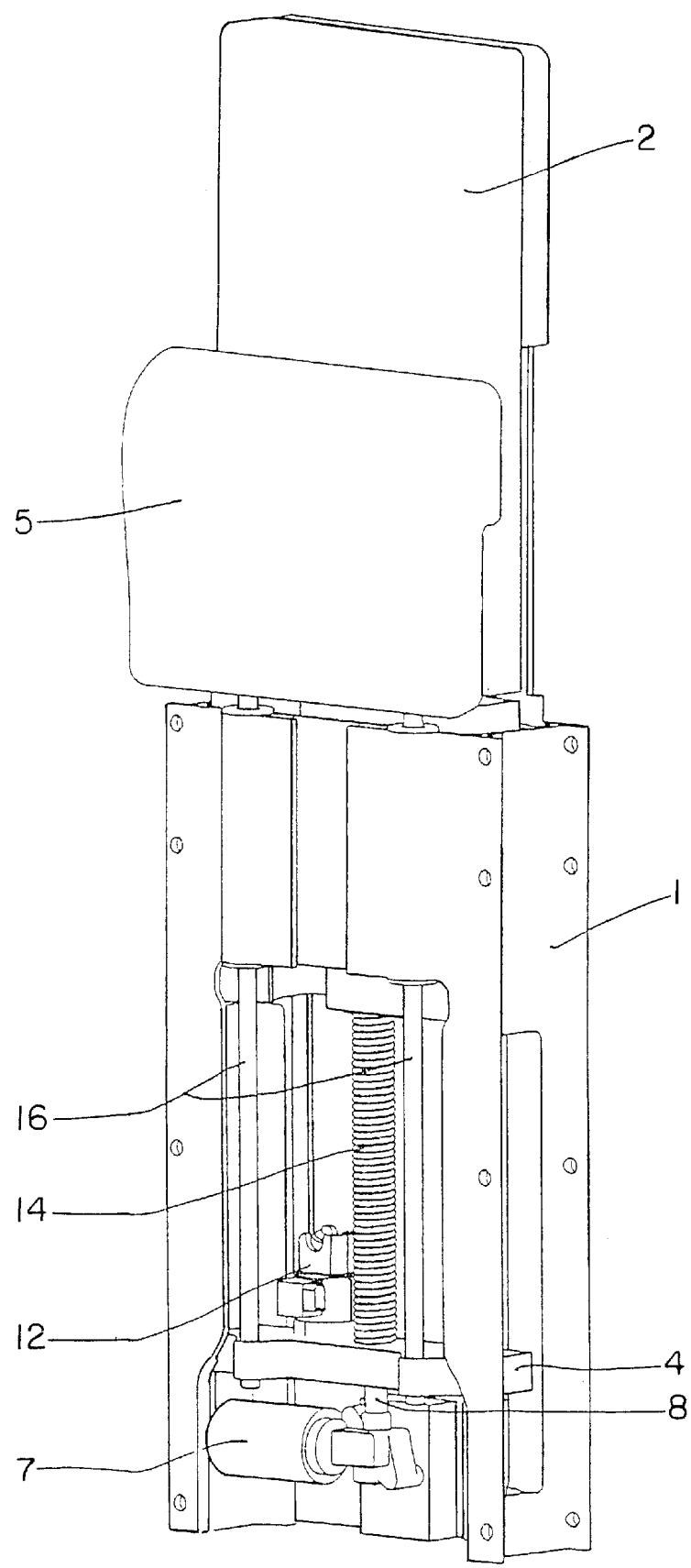
Figure 19:
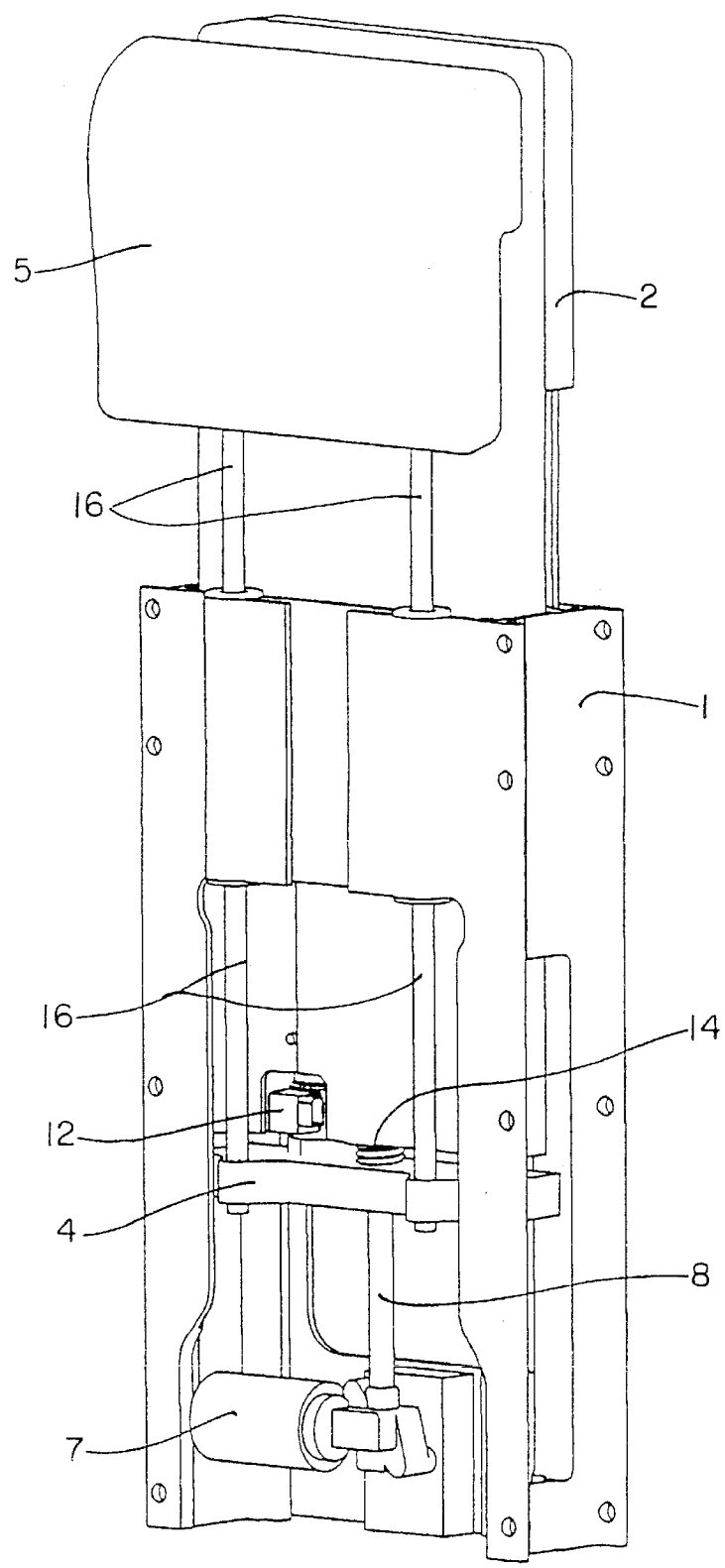

FIG. 1 in a lengthwise cross section, one embodiment of the roll bar protection system with circular-arc curved inner and outer box profile and a headrest integrated directly in the inner box profile, represented in the starting position with inner box profile fully retracted, FIG. 2 an embodiment per FIG. 1, but with inner box profile or headrest partly extended, FIG. 3 an embodiment per FIG. 1, but with headrest fully extended, FIG. 4 an embodiment per FIG. 1, with inner box profile extended after a crash in its roll bar function, starting from a position of the comfort drive per FIG. 2, FIG. 5 a diagram per FIG. 4, but starting from a position of the comfort drive per FIG. 3, FIG. 6 a magnified feature from FIG. 5, showing the locking of the inner box profile by means of a first embodiment of the locking latch in a toothed rod in the outer box profile in the locked condition, FIG. 7 a diagram similar to FIG. 6, but in the state immediately prior to locking, FIG. 8 in an exploded diagram, the essential elements of the first configuration of the locking system for the locking of the inner box profile with the outer box profile, as well as the release system for the inner box profile in a crash situation, FIG. 9 in a simplified longitudinal cross section, the guiding of the inner box profile in the outer box profile, as well as the essential elements of the comfort drive for adjusting the headrest in normal operation, FIG. 10 in a cross section along line I—I of FIG. 2, the guiding of the inner box profile by guide rollers arranged on it in corresponding guide slots in the outer box profile, FIG. 11 in an exploded view per FIG. 8, the essential elements of the second configuration of the locking system for the locking of the inner box profile with the outer box profile, as well as the release system for the inner box profile in a crash situation, FIG. 12 in a magnified feature diagram, the locking of the single-arm locking latch per FIG. 11 with the actuator of the release system, FIG. 13 in a lengthwise section diagram, an embodiment of the roll bar protection system with the single-arm locking latch per FIG. 11 with headrest completely extended per FIG. 13, FIG. 14 an embodiment per FIG. 13 with fully extended inner box profile in its function of roll bar after a crash, starting from a position of the comfort drive per FIG. 2, FIG. 15 in a lengthwise section diagram, an embodiment of the roll bar protection system with the single-arm locking latch according to the second configuration per FIG. 11 in a position of the headrest after a crash and a position of the comfort drive corresponding to FIG. 5 immediately prior to the reversal process, FIG. 16 in a magnified feature diagram, the beginning of the retraction movement of the single-arm lever in the actuator of the release system, FIG. 17 in a magnified feature diagram, the position of the locking latch during reversal of the roll bar immediately prior to locking with the release system, FIG. 18 in a schematic perspective diagram, another embodiment of the roll bar protection system with straight inner and outer box profiles and the headrest retracted, and FIG. 19 a diagram corresponding to FIG. 18, but with headrest extended.

FIG. 1, as well as FIGS. 2 through 5, show in schematic representation a longitudinal section through a preferred embodiment of the powered headrest according to the invention for a passenger car seat in the bottom area of a convertible with integrated roll bar protection function.

In FIGS. 2 through 5, there is shown a configuration with a curved trajectory for the drive; of course, it is also possible to provide a straight trajectory for the drive, which shall be described by means of FIGS. 18 and 19.

The embodiment according to the invention has two box profiles as basic elements, an outer box profile 1 firmly connected to the car body as a kind of case, which contains all the drive elements, and an inner box profile 2 which, as represented in FIG. 10 by means of a cross section along line I—I of FIG. 2, is guided on rollers 3 mounted on its side in the outer box profile 1 (also see FIG. 9), and which is detachably connected to a tie-bar 4. For stable guidance of the inner box profile 2 and the tie-bar 4, guide slots 3a are fashioned in the outer box profile 1 for the rollers 3.

Both box profiles 1 and 2 are preferably formed by a welded steel construction or by extruded aluminum profiles.

On the inner box profile 2, a headrest 5 is fashioned. This headrest function is accomplished by a suitable plastic foam 6 at the upper part of the inner box profile 2 with customary final finish. The inner box profile 2 is so mechanically stable in the region of the headrest 5 that it can also perform the function of the roll bar in event of a flip-over.

The foam 6 preferably continues into the guide region of the box profile 2, so that an impact protection is still provided in the extended state of the headrest (FIGS. 2–5).

For the driving of the tie-bar 4, which is detachably connected to the inner box profile 2 and, thus, for the extension and retraction of the headrest 5, there is provided a drive 7, preferably an electric motor with gearing and a lengthwise drive spindle 8, while there is a spindle nut 9 provided in the tie-bar 4 to accommodate the drive spindle, which in the embodiment shown is able to rotate and move in linear manner with curved trajectory (FIG. 9).

On the inside of the outer box profile 1, a toothed rod 10 is arranged, which can engage with a locking latch 11, which in this example has three teeth matching the teeth of the toothed rod. This locking latch 11 can turn about a shaft 11a and is fastened to the inner box profile 2, and it engages with pretensioned compression springs 13.

On the tie-bar 4, a so-called actuator 12 is fastened, which can be formed by a conventional release magnet or by a conventional pyrotechnic cartridge. Thus, the locking latch 11 engages with the actuator 12 in a detachable locking manner via a release system 12a. This connection, which can be broken in event of danger, shall be explained in greater detail afterwards by means of FIGS. 6–8. An alternative embodiment will also be described by means of FIGS. 11 and 12.

The locking latch 11 therefore joins the movable inner box profile 2 to the power-operated tie-bar 4, forming a unit which is detachable via the actuator 12. This unit integrates both the pretensioned compression springs 13 for the locking latch 11 and a pretensioned compression spring 14 which drives the roll bar in the form of the inner box profile in case of danger, the compression spring thrusting with its upper end against an intermediate wall 15 of the inner box profile 2, preferably via a thrust washer, and the pretensioned compression spring 14 is supported by its lower end against the tie-bar. This compression spring 14 can preferably be guided by means of a spring guide bolt (not shown), as has become familiar, for example, from DE 39 27 265 A1, mentioned above.

The construction of the locking latch 11 and its engagement with the actuator 12 is represented in the magnified views of FIGS. 6 and 7, as well as the exploded view of FIG. 8. Accordingly, in the first embodiment presented, the locking latch 11 consists of a two-arm lever, which is fixed in the inner box profile 2, able to turn about the shaft 11a, as already described. At one arm of the lever, the longer one, are situated the mating teeth 11b for engagement with the toothed rod 10 after a crash releases the roll bar, to secure the extended position of the roll bar. At the other, short arm of the two-piece lever there is a borehole 11c, which accommodates a locking pin 11d, also known as a detent bolt, which can engage in detachable locking manner with a hook-shaped locking element 12b of the actuator 12, forming the release system 12a. When the actuator in a flip-over situation is triggered by corresponding sensors, the hook-shaped locking element 12b releases the locking pin 11d, whereupon, as represented in FIGS. 4–6, the teeth 11b engage with the toothed rod 10 by the force of the compression springs 13, so that the roll bar cannot be pushed back from the extended position when it strikes the ground during the flip-over.

During normal operation, as represented in FIGS. 1–3, the locking latch does not engage with the toothed rod 10, since the hook-shaped locking element 12b of the actuator 12 holds the locking lever 11 in position against the force of the compression springs 13.

A number of possibilities are available to the practitioner for locking the locking latch 11 to the actuator 12, several of which are presented in DE 43 42 401 A1.

The power-operated headrest with roll bar protection function according to the invention works as follows:

In normal operation, the locking latch 11 is locked in the actuator 12, the compression springs 13 being pretensioned. By activating the electric drive 10, the tie-bar 4 with its spindle nut 9 can be moved up and down by means of the drive spindle 8. Since the inner box profile 2 is connected to the tie-bar 4, guided by means of the rollers 3, the foam-padded headrest 5 is moved accordingly, while the rollers 3 ensure the necessary guidance in the outer box profile 1 (also see FIGS. 9 and 10).

In FIG. 1, the fully retracted condition of the headrest is shown. In the depiction of FIG. 2, the headrest is partly extended (partial stroke) and in the depiction of FIG. 3 the headrest 5 is fully extended.

In the event of a flip-over detected by the vehicle's sensors, the actuator 12 is triggered. In this way, the release system 12a is unlocked by releasing the locking pin 11d of the locking latch 11 and the pretensioned compression spring 14 drives the inner box profile into the upper end position, as shown in FIGS. 4 and 5. The compression springs 13 bring the locking latch 11, which can now swivel, into engagement with the toothed rod 10 (also see FIG. 6).

This releasing can occur in any position of the extended headrest. Thus, FIG. 4 shows the final crash position of the headrest partially extended per FIG. 2, and FIG. 5 shows the final crash position for the fully extended headrest 5 of FIG. 3.

As will be evident from these figures, after a crash triggering the locking latch 11 moves upward with the inner box profile 2, this inner box profile 2 being lifted by the tie-bar 4, while the tie-bar 4 remains in the release position with the actuator 12 located on it.

After an unintentional release, the system can be automatically reversed by moving the tie-bar 4 up to the inner box profile in the upper end position. During the approach motion, the compression springs 13 again become pretensioned and the locking latch 11 is brought into the opening position by activating bevels 12c arranged on the actuator 12 (or on the tie-bar 4) and the detent latch 12b of the actuator 12 is again closed (FIGS. 7 and 8). Then the locking latch 11 is no longer engaged with the toothed rod 10 and thus the inner box profile 2 can again move freely.

The outer box profile 1, the case, is preferably anchored directly behind the vehicle seats, or to the rear wall in a two-seat convertible.

FIG. 11 shows an alternative embodiment of the locking latch 11, which affords even greater security of locking during a flip-over than the locking latch of FIG. 8. In this alternative embodiment, the locking latch 11 is fashioned as a single-arm lever, which can swivel by means of a pin 11a on the inner box profile 2, and which has at its other end the mating teeth 11b and the borehole 11c, in which the locking pin 11d, or detent bolt, is received. This locking pin 11d can be brought into a detachable locking engagement with the hook-shaped locking element 12b of the actuator 12, as shown in FIG. 2. When the hook-shaped locking element 12d swivels during a flip-over, the locking pin 11d and, thus, the rapid drive is released by means of the spring 14.

It is evident from FIG. 13, which shows the position of the roll bar corresponding to FIG. 3, that the compression springs 13 pretension the single-arm locking latch 11 in the direction of the toothed rod 10, while the detent bolt 11d locked in the actuator 12 prevents the locking latch 11 from engaging by its mating teeth 11b with the teeth of the toothed rod 10.

If the locking latch 11 is released per FIG. 14—which is analogous to FIG. 4—the compression springs 13 force the single-arm lever, i.e., the mating teeth 11b of the locking latch 11, into an engagement with the teeth of the toothed rod 10 and prevent a retraction of the roll bar during a flip-over, the diagram of forces being more favorable than when the locking latch is configured as a two-arm lever per FIG. 8.

FIGS. 15 through 17 illustrate the automatic reversal process in the alternative embodiment of the locking latch per FIG. 11 after a release. The actuator 12 is at first brought up to the lower end of the single-arm locking latch 11 by the tie-bar, or comfort drive, power-operated by means of the spindle 8 (FIGS. 15 and 16). As it continues to move, this end of the lever now engages once again via the entry bevel 12c with the hook-shaped locking element 12b, separating the mating teeth 11b from the toothed rod 10 (FIG. 17). With a downward movement of the tie-bar, and the teeth fully separated, the inner box profile 2 with the headrest 5 can then be moved down to the starting position once again.

Of course, instead of a curved motion trajectory, straight box profiles with a linear motion trajectory can also be provided, in which case the outer box profile, or case, is firmly attached in an appropriate position behind the seats of the vehicle and holds all necessary drive and locking elements.

Such a roll bar protection system is shown in FIGS. 18 and 19 in two different extended positions of the headrest. In the embodiment of the roll bar protection system according to FIGS. 18 and 19, the headrest 5 is not integrated in the inner box profile 2, which is guided in the outer box profile 1. The headrest 5 is firmly connected via two rods 16 guided in the outer case to the tie-bar 4, which can move up and down as comfort drive by means of the spindle 18 and the drive 7. On this tie-bar 4, similar to the first embodiment of the invention with the curved motion trajectory, the actuator 12 and the driving compression spring 14 are fastened. The release system 12a and the locking with the locking latch 11 is not visible in the representations of FIGS. 18 and 19; it corresponds to that according to the sample embodiments already described.

In the preceding, a headrest with integrated roll bar protection function has been described, which is driven by an electric motor and can move continuously to any desired position, whether on a curved trajectory or a straight-line motion path. From any position, the roll bar protection system can be placed in the maximum end position during a danger situation.

What is claimed is:

1. A roll bar protection system for motor vehicles, being associated with a vehicle seat, comprising:
   an outer box profile forming a case for components of the roll bar protection system, said outer box profile adapted to be mounted firmly on the vehicle,
   an inner box profile, able to move in the outer box profile via guide elements, which is designed as a roll bar and accommodates a fast drive for extension into an upper end protection position in event of danger, and
   a drive arrangement for extension and retraction movement of the inner box profile comprising an electric motor/gearing arrangement with a threaded spindle of predetermined length, a tie-bar which can be moved in the outer box profile, and a nut for engagement with the threaded spindle, said drive arrangement detachably connected to the inner box profile, said fast drive including a compression spring having one end connected to an upper crosspiece of the inner box profile and another end connected to said tie-bar of said drive arrangement, and said drive arrangement being in linear relationship with said fast drive.

2. The roll bar protection system according to claim 1, wherein a head support cushion forming a headrest is formed on an upper piece of the inner box profile.

3. The roll bar protection system according to claim 1, wherein at least one other lengthwise shaped body, guided in the outer box profile, is fastened to the tie-bar, on which a head support cushion forming a headrest is formed in an upper region adapted to face a passenger, in front of the inner box profile.

4. The roll bar protection system according to claim 1, wherein guide rollers as the guide elements are arranged on the inner box profile and guide slots for guiding the guide rollers and the tie-bar are formed in the outer box profile.

5. The roll bar protection system according to claim 1, wherein the inner box profile is connected via a release system which releases this box profile in event of danger, to an actuator which can be activated in event of danger, which is firmly mounted on the tie-bar.

6. The roll bar protection system according to claim 5, wherein a locking latch with toothed profile is hinged by a shaft on the inner box profile, being detachably connected via the release system to the actuator which is activated in event of danger.

7. The roll bar protection system according to claim 6, wherein a toothed rod is firmly mounted inside the outer box profile, with which the toothed profile of the locking latch can be brought into engagement in event of danger after release of the locking latch by the release system, using compression springs which engage with the locking latch.

8. The roll bar protection system according to claim 7, wherein the locking latch is fashioned as a two-arm lever, with a longer upper arm and a shorter lower arm, there being mounted on the longer upper lever arm, where the compression springs engage, the toothed profile, and on the shorter lower lever arm a detent bolt for a detachable engagement with a hook-shaped locking element of the actuator, forming the release system.

9. The roll bar protection system according to claim 7, wherein the locking latch is fashioned as a single-arm lever, which is hinged at its upper on the inner box profile by the shaft, being provided in an intermediate section where the compression springs engage with the toothed profile, and at its lower end is arranged a detent bolt for a detachable engagement with a hook-shaped locking element of the actuator, forming the release system.

10. The roll bar protection system according to claim 6, wherein an entry bevel is formed on the actuator for the lower end of the locking element.

11. The roll bar protection system according to claim 4, wherein the lower end of the driving compression spring is fastened to the actuator or directly to the tie-bar.

12. The roll bar protection system according to claim 1, wherein both the inner and the outer box profile are curved as circular arcs and the outer box profile is adapted to be fastened behind the vehicle seat.

13. The roll bar protection system according to claim 12, wherein the outer box profile is fastened to a rear wall behind the vehicle seat.

14. A roll bar protection system for motor vehicles, being associated with a vehicle seat, comprising:
an outer box profile forming a case for components of the roll bar protection system, said outer box profile adapted to be mounted firmly on the vehicle,
an inner box profile, able to move in the outer box profile via guide elements, which is designed as a roll bar and accommodates a fast drive for extension into an upper end protection position in event of danger, and
a drive arrangement for extension and retraction movement of the inner box profile comprising an electric motor/gearing arrangement with a threaded spindle of predetermined length, a tie-bar which can be moved in the outer box profile, and a nut for engagement with the threaded spindle, said drive arrangement detachably connected to the inner box profile, and wherein guide rollers as the guide elements are arranged on the inner box profile and guide slots for guiding the guide rollers and the tie-bar are formed in the outer box profile.

15. The roll bar protection system according to claim 14, wherein at least one other lengthwise shaped body, guided in the outer box profile, is fastened to the tie-bar, on which a head support cushion forming a headrest is formed in a upper region adapted to face a passenger, in front of the inner box profile.

16. The roll bar protection system according to claim 14, wherein the fast drive includes a pretensioned driving compression spring having one end connected to an upper crosspiece of the inner box profile and another end connected to the tie-bar of the drive arrangement.

17. The roll bar protection system according to claim 14, wherein the inner box profile is connected via a release system which releases this box profile in event of danger, to an actuator which can be activated in event of danger, which is firmly mounted on the tie-bar.

18. The roll bar protection system according to claim 17, wherein a locking latch with toothed profile is hinged by a shaft on the inner box profile, being detachably connected via the release system to the actuator which is activated in event of danger.

19. The roll bar protection system according to claim 18, wherein a toothed rod is firmly mounted inside the outer box profile, with which the toothed profile of the locking latch can be brought into engagement in event of danger after release of the locking latch by the release system, using compression springs which engage with the locking latch.

20. The roll bar protection system according to claim 19, wherein the locking latch is fashioned as a two-arm lever, with a longer upper arm and a shorter lower arm, there being mounted on the longer upper lever arm, where the compression springs engage, the toothed profile, and on the shorter lower lever arm a detent bolt for a detachable engagement with a hook-shaped locking element of the actuator, forming the release system.

* * * * *